INVENTORS
Jakob Hacks & Herbert Flicker
BY [signature]
Att'y

INVENTORS
JAKOB HACKS & HERBERT FLICKER
BY Theodore Hafner
Att'y

INVENTORS
JAKOB HACKS & HERBERT FLICKER
BY Theodore Haynes
Atty.

INVENTORS
JAKOB HACKS & HERBERT FLICKER
BY Theodore Haffner
Attorney

Oct. 4, 1966 J. HACKS ET AL 3,277,379

FREQUENCY GENERATOR

Filed Nov. 2, 1962 7 Sheets-Sheet 5

INVENTORS
JAKOB HACKS & HERBERT FLICKER
BY Theodore Haber
ATTY

INVENTORS
JAKOB HACKS & HERBERT FLICKER
BY Theodore [signature]
ATTY

FREQUENCY GENERATOR

Filed Nov. 2, 1962 7 Sheets-Sheet 7

INVENTORS
JAKOB HACKS & HERBERT FLICKER
BY Herold Hagner
ATT'Y

United States Patent Office 3,277,379
Patented Oct. 4, 1966

3,277,379
FREQUENCY GENERATOR
Jakob Hacks and Herbert Flicker, Munich, Germany, assignors to Rohde & Schwarz, Munich, Germany, a partnership
Filed Nov. 2, 1962, Ser. No. 235,157
Claims priority, application Germany, Nov. 14, 1961, R 31,455
29 Claims. (Cl. 325—453)

This invention relates to a frequency generator capable of being adjusted with great precision and having an output frequency that can be maintained constant for the purpose of measuring, transmitting, or receiving.

In known generators of this type, frequency adjustment is made either so that the frequency is adjusted in decades in coarse steps by means of stepping switches, and the last positions of the frequency are read from an interpolation scale; or in such a manner that the frequency is already adjusted in the first decimal position on a corresponding number of continuous scales whereby the desired coarse step can be locked on the corresponding scale. In this second method it is also possible to provide a last interpolation scale for the adjustment of intermediate values of the last decimal positions. Upon releasing the locking of the scales of the higher decimals it is also possible to continuously sweep a larger frequency range with this known apparatus.

These known generators which have the feature of being adjustable over a range of continuous frequency variation, have the disadvantage of requiring several tunable scales and oscillators.

It is an object of the invention, in a frequency generator, to provide for continuous frequency adjustment a single scale and a single interval oscillator only, and to switch over the scale from one set of values to another set of values.

Starting from a frequency generator serving for measuring, transmission or reception, and having an output frequency equal to the sum or different of a harmonic of a stabilized fixed standard frequency $F_{N1}$, or of a frequency derived therefrom by division or multiplication, and of a continuously variable part derived from an interval oscillator $I_{O1}$, and in which the continuously variable part of the output frequency can be reduced selectively by the factor N, the invention proposes that from the sum or difference of interval oscillator frequency $I_{O1}$ divided by the factor N, and a further step-wise selectable standard frequency $F_{N2}$, a new interval generator $I_{G1}$ is formed which sweeps the same frequency range as $I_{O1}$, or that from the sum or difference of the interval oscillator frequency $I_{O1}$ divided by the factor N, and of a further step-wise selectable standard frequency $F_{N2}$, the new interval generator $I_{G1}$ of equal frequency range is formed.

In this way, as required for various measuring problems, it is possible, on the one hand, to sweep only a smaller frequency interval with very great accuracy and adjustability of frequency, and, on the other hand, after a simple switch over, to sweep with the same scale a larger frequency interval. In the application of a frequency generator in accordance with the invention in a heterodyne receiver, this means for example, that the receiver scale can be used firstly to scan a larger frequency range for transmissions to be received, and subsequently after localization of the transmissions to be received, to reduce the range of the scale in such a manner that the receiver can now be tuned to the transmitter signal in the immediate neighborhood of the transmissions to be received, with the same interval oscillator, and with larger accuracy yet on the same reading scale.

The invention will be more fully explained in the following by means of schematic drawings, on several examples of realization.

Figure 3:
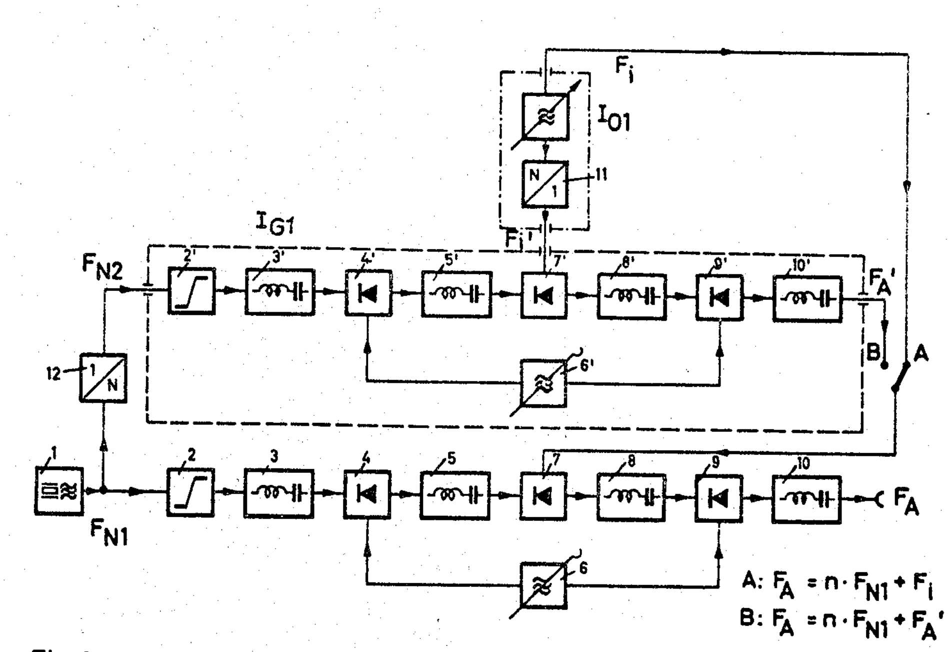
Figure 5:
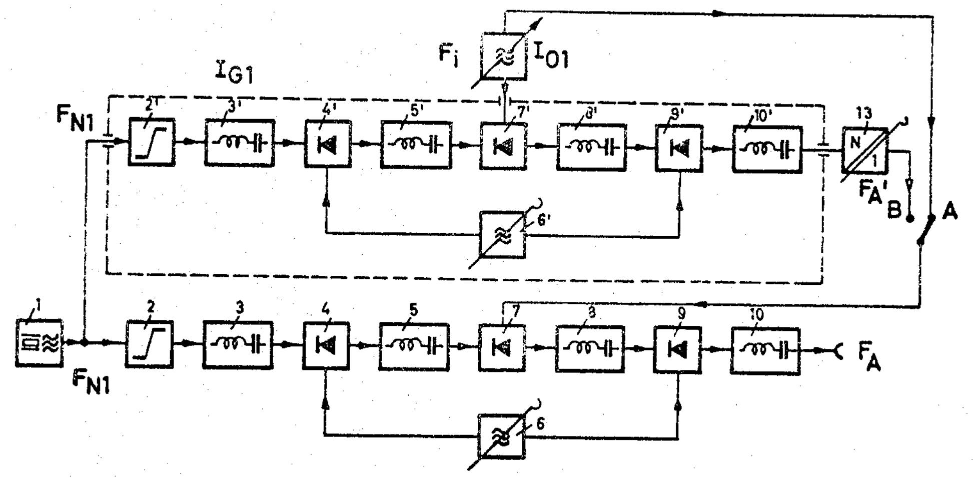
Figure 10:
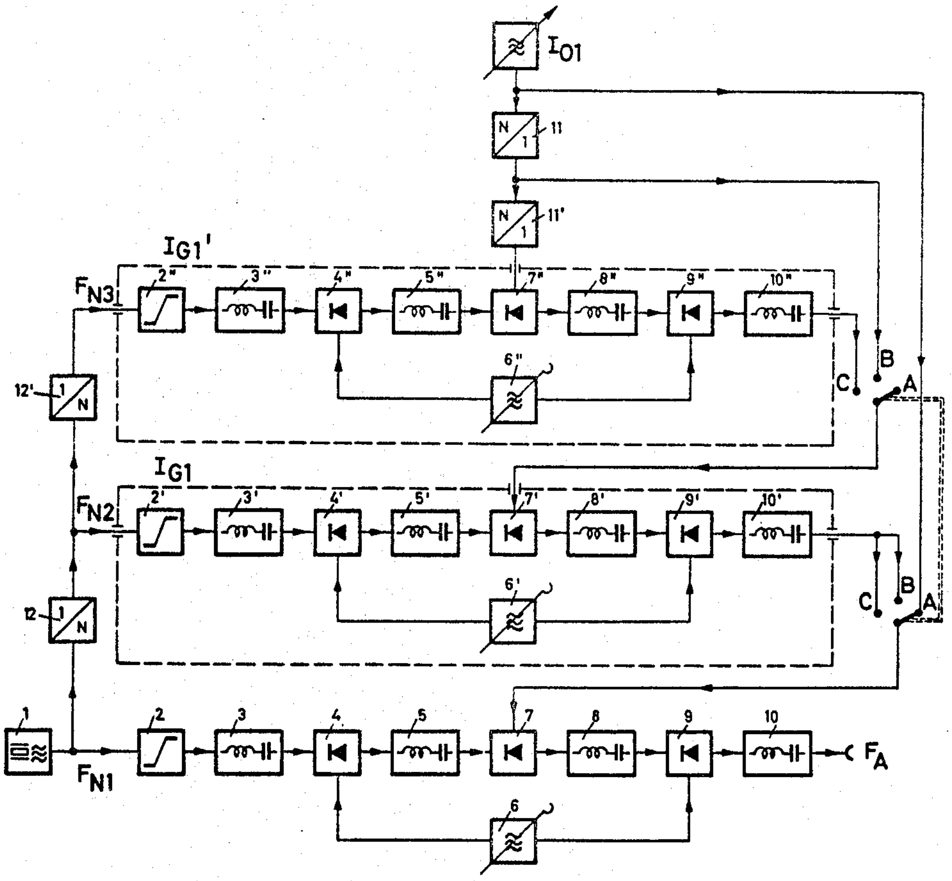

FIGS. 3, 5, and 10 show examples of realization according to the invention in applying the principle of frequency synthesis.

FIGS. 4, 6, 7, and 9 show examples of realization according to the invention in applying frequency analysis.

Figure 8:
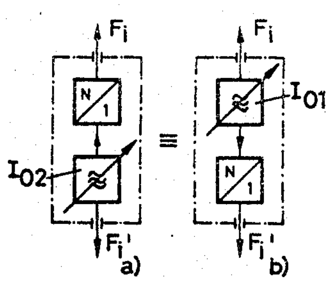

FIG. 8 shows two feasible forms of realization of interval oscillators.

Figure 11:
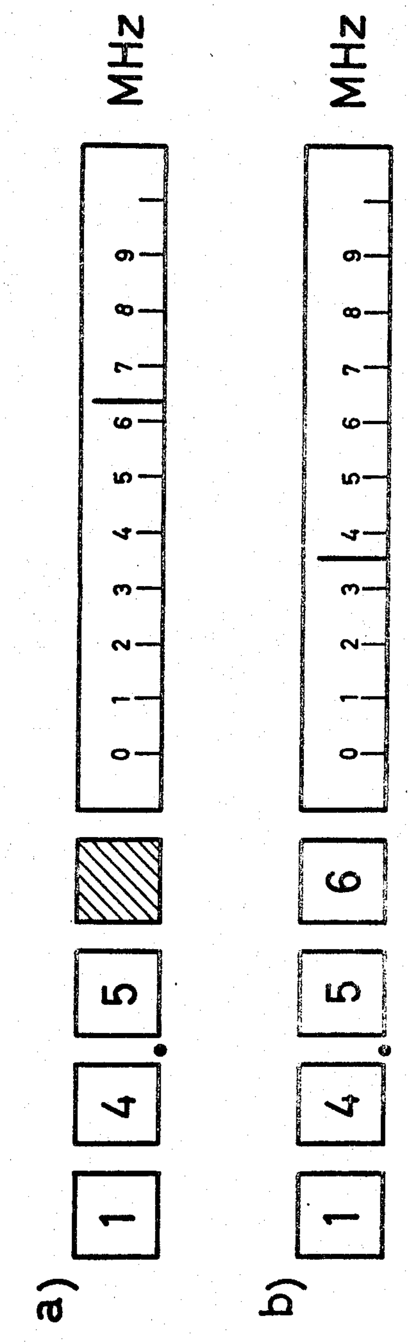

FIG. 11 shows a form of realization for a scale for use in a frequency generator according to the invention.

The formation of the sum or difference of a harmonic of a fixed standard frequency $F_{N1}$ or $F_{N2}$ and of a part derived from an interval oscillator $I_{O1}$ or interval generator $I_{G1}$ can be achieved in a manner well known per se in accordance with the method of frequency synthesis or frequency analysis. For a better understanding it will be assumed in the following and in the description of the various arrangements that there is always a sum formation in the individual frequency converter arrangements. In a like manner it will be assumed that there is always a difference formation in the individual frequency converter arrangements.

Figure 1:
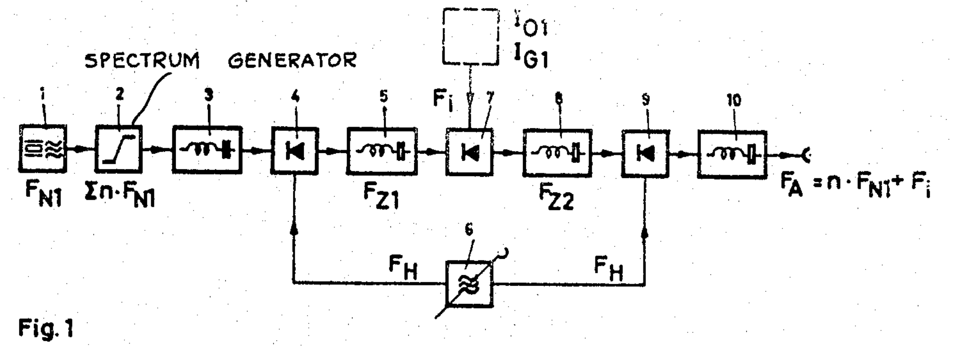
FIG. 1 shows the principal circuit diagram of a usual frequency synthesizing arrangement.

In this circuit arrangement shown in FIG. 1, in applying frequency synthesis with preconversion and re-conversion, a fixed standard frequency $F_{N1}$ is produced by a quartz stabilized oscillator 1. Distorter 2 forms a frequency spectrum $\Sigma n \cdot F_{N1}$ by means of non-linear circuit elements. By means of input filter 3, all spectrum frequencies not required in the first frequency conversion, are filtered because they may be situated for example in the frequency range of the first intermediate frequency. In mixer stage 4, a spectrum frequency $n \cdot F_{N1}$ situated in the pass range of input filter 3, is converted wtih the frequency $F_H$ of auxiliary oscillator 6 into the first intermediate frequency $F_{Z1}$. The first ZF-filter 5 is so dimensioned that only a converted spectrum frequency, namely intermediate frequency $F_{Z1}$ is passed; all others are filtered by means of the high sensitivity of this fixedly tuned filter. In the mixing stage 7, the first intermediate frequency is converted with the frequency $F_I$ of interval oscillator $I_{O1}$, or of interval generator $I_{G1}$, into a second intermediate frequency $F_{Z2}$. The disturbing frequencies resulting from the mixing process, are filtered by ZF-filter 8, the pass range of which is equal to the frequency variation of frequency $F_I$ of interval oscillator $_{O1}$, or of interval generator $I_{G1}$, respectively. In mixing stage 9, the conversion is achieved of the first intermediate frequency $F_{Z2}$ with the frequency $F_H$ furnished from auxiliary oscillator 6, and the result is the output frequency $F_A = n \cdot F_{N1} + F_I$. By means of the output filter 10, the disturbing mixing products, resulting from the mixing process in mixer stage 9, are filtered. First intermediate frequency $F_{Z1}$, second intermediate frequency $F_{Z2}$, and output frequency $F_A$, of course, can also be formed as differences. By step-wise varying of frequency $F_H$ of oscillator 6, the desired harmonic $n \cdot F_{N1}$ can be selected, the frequency position being fixed, i.e. the point from which interval oscillator $I_{O1}$ can continuously sweep, with frequency $F_I$, the desired frequency range.

The frequency $F_H$ of auxiliary oscillator 6 is not contained in the output frequency $F_A$ because it occurs during mixing in mixing stages 4 and 9 in different signs of polarity and, therefore, is eliminated. The frequency of auxiliary oscillator 6, thus, determines the order number only and, thereby, the frequency position of the harmonic to be selected from the frequency spectrum $\Sigma n \cdot F_{N1}$.

Figure 2:
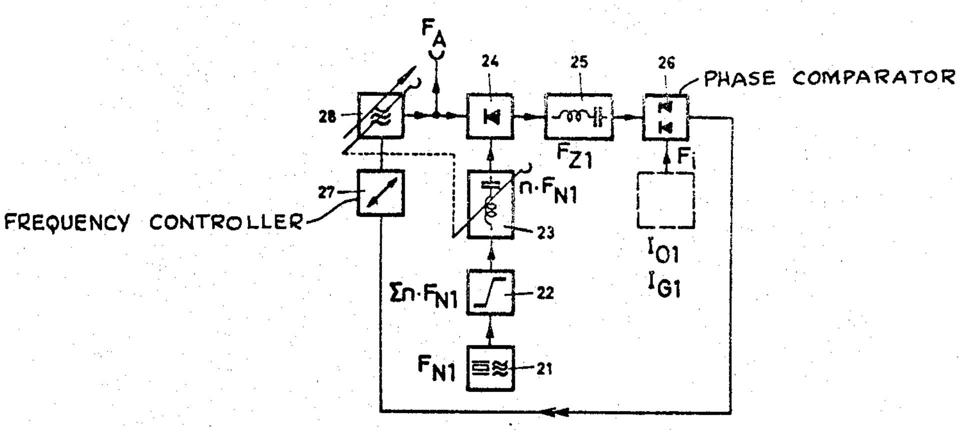
FIG. 2 shows the principal circuit diagram of a usual circuit analyzing arrangement.

In the circuit arrangement shown in FIG. 2, in applying frequency analysis with phase re-adjustment, the fixed normal frequency $F_{N1}$ is produced by a quartz stabilized oscillator 21. Distorter 22 forms the frequency spectrum $\Sigma n \cdot F_{N1}$ by means of non-linear circuit elements. By means of the step-wise tunable harmonic filter 23 a harmonic of the standard frequency $F_{N1}$ is filtered, and it is converted in mixer stage 24 with the output frequency $F_A$ produced by oscillator 28 to the first intermediate frequency $F_{Z1}$. The harmonic filter 23 prevents the selected harmonic $n \cdot F_{N1}$, apart from the image frequency, from entering mixing stage 24. This image frequency, together with the frequency of oscillator 28, would also result in a first intermediate frequency. The disturbing frequencies resulting from the mixing process are filtered by the fixedly tuned intermediate filter 25, the pass range of which is equal to the frequency variation of frequency $F_i$ of interval oscillator $I_{O1}$, or interval generator $I_{G1}$. In phase bridge 26 the phase of the first intermediate frequency $F_{Z1}$ is compared with the phase of the interval oscillator frequency or interval generator frequency $F_i$. The control voltage obtained from the phase comparison, influences through control device 27 the oscillator 28, and thereby the output frequency in such a manner that the output frequency becomes $F_A = n \cdot F_{N1} + F_i$. The frequency of oscillator 28, therefore, and thereby the output frequency, is without frequency error re-adjusted or synchronized to the sum or difference of a harmonic of standard frequency $F_{N1}$ selected by harmonic filter 23 and frequency $F_i$ of interval oscillator $I_{O1}$ or interval generator $I_{G1}$, respectively. By step-wise variation of harmonic filter 23, therefore, the frequency position of the frequency interval continuously swept by interval oscillator $I_{O1}$ or interval generator $I_{G1}$, can be determined.

FIG. 3 shows a form realizing the invention in which the output frequency $F_A$ of the frequency generator is produced from the sum or difference of standard frequency $F_{N1}$ step-wise selectable by oscillator 6, and the frequency $F_i$ of interval oscillator $I_{O1}$ (switch position A), or frequency $F_A'$ of interval generator $I_{G1}$ (switch position B) in accordance with the method of frequency synthesis wth pre-conversion and re-conversion as it is described in principle on hand of FIG. 1. Identical parts, therefore, are designated with the same references as in FIG. 1. The formation of frequency $F_A'$ of interval generator $I_{G1}$ is achieved as sum or difference of frequency $F_i'$ of interval oscillator $I_{O1}$, divided in frequency divider 11 by the factor N, and of a further standard frequency $F_{N2}$ derived by frequency division in frequency divider 12 from standard frequency $F_{N1}$ and this formation of frequency $F_A'$ is also achieved in accordance with the above described method of frequency synthesis by pre-conversion and re-conversion. Again on the assumption of sum formation, the function of this arrangement is as follows:

In switch position A, there appears at the output of the frequency generator a frequency $F_A = n \cdot F_{N1} + F_i$. The frequency position, i.e. the coarse range as described above, is determined by the step-wise adjustable oscillator 6. The continuous variation of the output frequency $F_A$ is achieved by the tunable interval oscilator $I_{O1}$. In this way it is possible to sweep a predetermined frequency band step-wise and continuously with relatively large frequency intervals of frequency $F_i$.

For fine tuning, in switch position B, a new interval generator $I_{G1}$ with output frequency $F_A'$ is formed from divided frequency $F_{N2}$ and from divided interval oscillator frequency $F_i'$. The output frequency $F_A'$ is step-wise selectable by means of adjustable oscillator 6', and in frequency intervals which are smaller by the factor N than the intervals in switch position A. The sum formation of this frequency $F_i'$ and of the harmonic $n \cdot F_{N1}$ selected by oscillator 6, results now in an output frequency $F_A = n \cdot F_{N1} + F_A' = n \cdot F_{N1} + n \cdot F_{N1}/N + F_i/N$.

As a result now, with corresponding adjustment of ocillators 6 and 6', the output signal $F_A$ can be varied stepwise with smaller frequency intervals, and at the same time the same scale of interval oscillator $I_{O1}$ can be used because not only the frequency $F_i$ (larger interval) but also the frequency $F_i'$ and, thereby, the output frequency $F_A'$ of interval generator $I_{G1}$ (reduced interval) can be derived from the same oscillator. Both the coarse and fine tuning can be performed on a single scale by adjustment of the same interval oscillator $I_{O1}$. Thus, in switch position A, the output frequency can be varied coarsely within a relatively wide frequency range, and then by switching to position B, can be more precisely adjusted through a frequency range smaller than the coarse frequency range by the factor N. Since fine adjustments can be made by tuning the same oscillator, the same scale can be used to calibrate both frequency ranges. Similar considerations apply to the example of realization shown in FIG. 4, in which the formation of the output frequency of the frequency generator is achieved from the sum or the difference of the step-wise selectable multiple of standard frequency $F_{N1}$ and frequency $F_i$ of interval oscillator $I_{O1}$ (switch position A), or frequency $F_A'$ interval generator $I_{G1}$ (switch position B) according to the method of frequency analysis with phase readjustment. Here also the same parts are designated by the same references as in FIG. 2. The formation of frequency $F_A'$ of interval generator $I_{G1}$ is achieved as sum or difference of frequency $F_i'$ of interval oscillator $I_{O1}$ divided by the factor N in frequency divider 31, and of a further frequency $F_{N2}$ derived from standard frequency $F_{N1}$ by frequency division in frequency divider 32, and this formation of frequency $F_A'$ is also achieved according to the method of frequency analysis with phase readjustment. Its function corresponds to that according to FIG. 3 in so far as it concerns the ability to switch over from one interval width to another in accordance with the invention.

Figure 4:
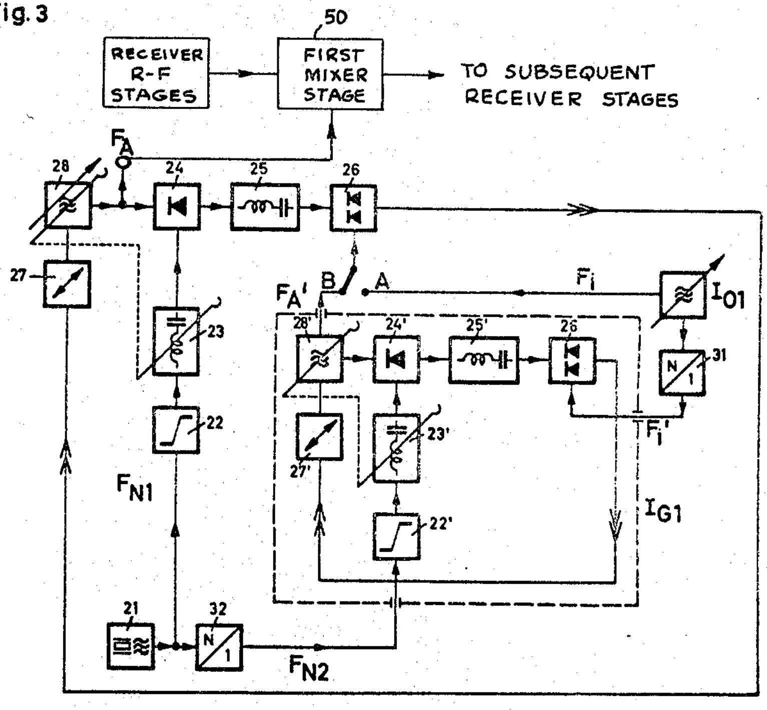
Figure 6:
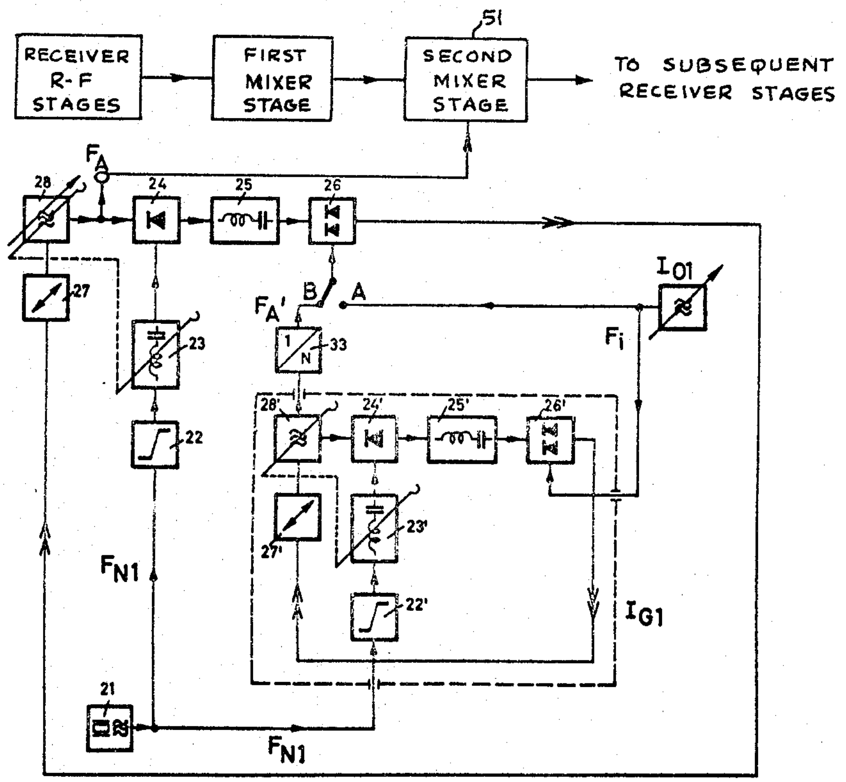

The switching arrangement shown in FIGS. 5 and 6 corresponds in structure substantially to the arrangement according to FIGS. 3 and 4, respectively. Deviating from these latter arrangements, is the formation of output frequency $F_A'$ in such a manner that the output frequency of interval generator $I_{G1}$ proper, produced by sum or difference formation from signals $F_{N1}$ and $F_i$, is divided by the factor N only in frequency divider 13 and 33, respectively, arranged further on in the circuit.

Figure 7:
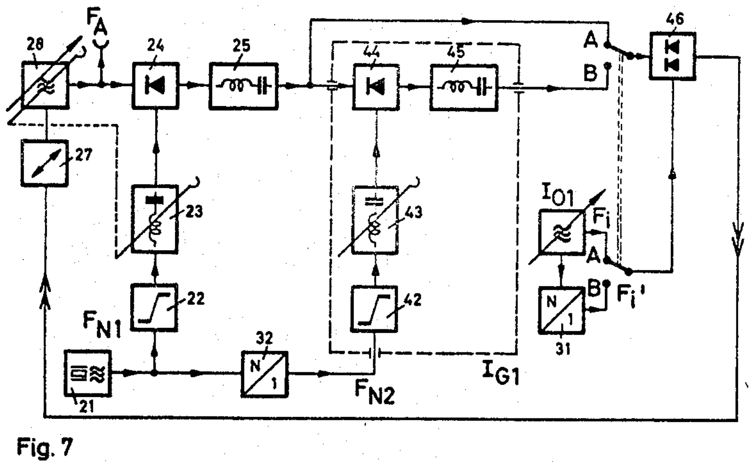

FIG. 7 shows a further example of realization, and this again in accordance with the method of frequency analysis. The formation of the output frequency $F_A$ of the frequency generator is achieved from the sum or difference of standard frequency $F_{N1}$ step-wise selectable and frequency $F_i$ of interval oscillator $I_{O1}$ (switch position A); or from the multiple selectable in further steps by means of a tunable harmonic filter 43 of standard frequency $F_{N2}$ derived from standard frequency $F_{N1}$ by division in frequency divider 32 and of the frequency $F_i'$ of interval oscillator $I_{O1}$ divided by the factor N in frequency divider 31 (switch position B). The function of this arrangement corresponds to that of the arrangement according to FIGS. 3 and 4, respectively.

The continuously variable part $F_i$ derived from interval oscillator $I_{O1}$ can also be made, in accordance with the invention, a multiple of the frequency of an interval oscillator $I_{O2}$ having a lower frequency. In place of frequency $F_i'$ divided by the factor N, of interval oscillator $I_{O1}$, another multiple or the fundamental frequency itself of interval oscillator $I_{O2}$ may be employed.

FIG. 8 shows interval oscillator $I_{O2}$ with multiplier and the application-wise equivalent embodiment with interval oscillator $I_{O1}$ and frequency divider.

Figure 9:
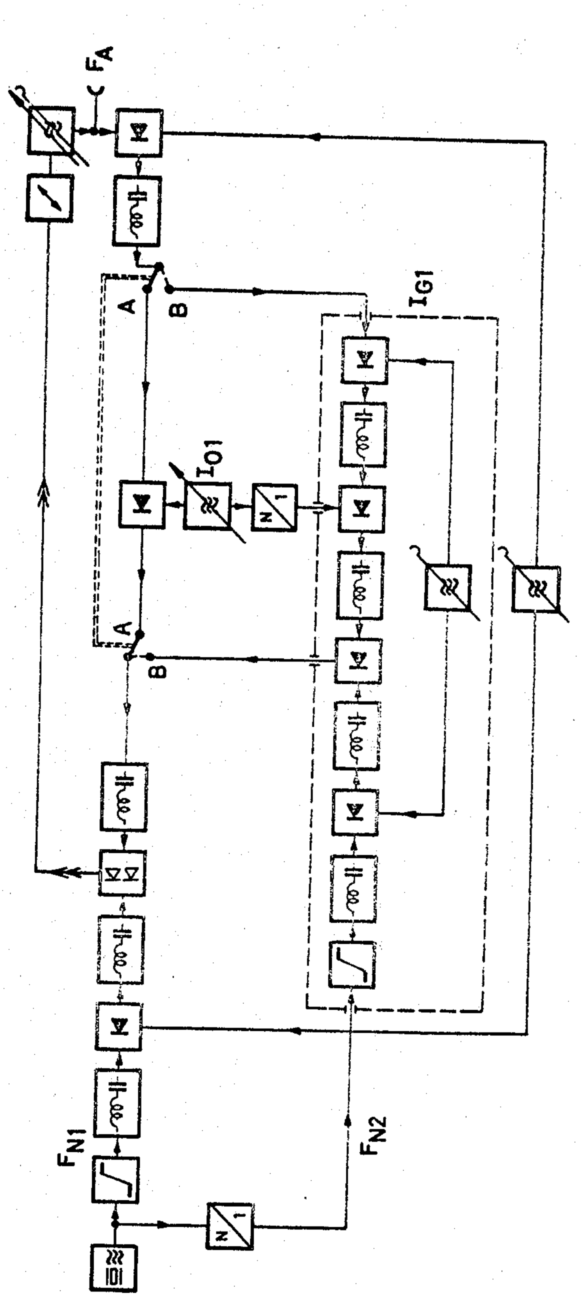

FIG. 9 shows a further example of realizing the frequency generator in accordance with the invention, with two selectable intervals of different widths. In this example of realization, in a manner known per se, the formation of the output frequency of the frequency generator takes place according to the method of frequency analysis, with the aid of pre-conversion and re-conversion by means of auxiliary oscillator for the selection of the desired harmonic of the standard frequency such as described especially in the German patent specification 910,699.

FIG. 10 shows a form of realization of a frequency generator in accordance with the invention, in which the continuously variable part of the output frequency can be selectably reduced in three steps (switch position A, B, C), and in which, therefore, the method explained on hand of FIG. 3 is employed several times. Here, too, identical parts are designated with identical references as in FIGS. 1 and 3, respectively. The function corresponds to that described with respect to FIG. 3.

In accordance with the invention, advantageously, scales are used in which at the switching of the range, i.e. at variation of the frequency position, the figures of the scale need not be varied. For this reason, preferably, the division factor N is selected as a power of ten. It is then only necessary to switch the start and end figures of the frequency range on the scale, present in each case, while the scale itself retains its figures. In accordance with the decimal figures system, also, the further possibility results to indicate the first figures of the decimal frequency value derived from the standard frequencies, $F_{N1}$ or $F_{N2}$, respectively, as designated more clearly in the above mentioned example, as figures at the start of the continuous scale. In switching over the range of the scale, it is then only required to increase the reading accuracy by adding a further decimal position, i.e. additionally to indicate as a figure the decimal position indicated at the tunable scale during coarse tuning and then during fine tuning to employ the scale to indicate a further decimal position. It will be understood that the value of the factor N may also be changed by a switching action as indicated, for example, by the switching symbol applied to Block 13 in FIG. 5 of the drawings.

FIG. 11 shows a feasible example of realizing such a scale, and more specifically FIG. 11A the coarse adjustment (for example switch position A in FIGS. 3–10) and FIG. 11B the fine adjustment (switch position B in FIGS. 3–10). The letters MHz in FIG. 11 stand for "megacycles." When using the frequency generator according to the invention as heterodyne oscillator is a heterodyne receiver with several frequency conversions, it is possible to inject the frequency generator into the first mixer stage of the receiver, and then to insert further along in the circuit, a fixedly tuned first intermediate frequency amplifier. Further fixed intermediate frequencies can follow. This use of the frequency generator is illustrated in FIGURE 4 of the drawings which shows the output signal $F_A$ of the generator connected to the first mixer stage 50 of a heterodyne receiver. It is also possible to derive the first heterodyne frequency immediately from a standard frequency, and to use the frequency generator according to the invention for a second or subsequent frequency conversion. In such a case variable intermediate frequencies are obtained. This use of the frequency generator is diagrammatically illustrated in FIGURE 6 of the drawings in which the output signal $F_A$ from the generator is shown connected to the second mixer stage 51 of a heterodyne receiver. In case there exists in the heterodyne receiver tunable input circuits or tunable circuits in the first ZF or in the subsequent intermediate frequencies, it is preferred to change the variation of the tuning elements for these tunable circuits together with the switch over of the variation of the frequency generator in order to save a separate operating button for the input circuits or for the first intermediate frequency circuits.

We claim:

1. A frequency generator having a single tunable scale for producing an output frequency equal to the sum or difference of a harmonic of a first stabilized fixed frequency and a continuously variable interval frequency comprising; means for producing a second stabilizing frequency by dividing said first stabilizing frequency by a predetermined factor, an interval generator connected to said second stabilizing frequency means, a frequency divider connected to said interval generator, an interval oscillator connected to said frequency divider to provide said interval generator with a first interval frequency divided by said predetermined factor, means for generating a second interval frequency at the output of said interval generator from the sum or difference of a harmonic of said second stabilizing frequency and said first interval frequency divided by said factor; switching means for selectively connecting either said second interval frequency or said first interval frequency to said frequency generator, and means for calibrating said second interval frequency on the tunable scale to be stepwise selectable over the same frequency range as said first interval frequency, so that the output of said frequency generator can be selected by step-wise selection of said first interval frequency, by actuation of said switching means, and by step-wise selection of said second interval frequency.

2. The frequency generator as recited in claim 1 wherein said harmonic frequencies are derived from the stabilized frequencies by division.

3. The frequency generator as recited in claim 1 wherein said harmonic frequencies are derived from the stabilized frequencies by multiplication.

4. The frequency generator as recited in claim 1 additionally comprising; a continuous scale having an adjustable range for reading the variations of the output frequency, and means for changing said range selectively by said factor.

5. The frequency generator as recited in claim 4 wherein said factor is a power of ten.

6. The frequency generator as recited in claim 4 wherein said switching means comprises means for switching over the start and end figures of the frequency range of said scale, while the setting of the figures on the scale remain unchanged.

7. The frequency generator as recited in claim 4 wherein the component of frequency derived from said first stabilized frequency of the output frequency is readable in figures from the start of said continuous scale.

8. The frequency generator as recited in claim 1 further comprising means for forming said output frequency as sum or difference between said first stabilized frequency and the first interval frequency.

9. The frequency generator as recited in claim 1 further comprising means for forming said output frequency as sum or difference between said first stabilized frequency and said second interval frequency.

10. The frequency generator as recited in claim 1 wherein said factor is switchable to various integral values.

11. A frequency generator having a single tunable scale for producing an output frequency equal to the sum or difference of a harmonic of a first stabilized fixed frequency and a plurality of continuously variable interval frequencies comprising, means for producing a plurality of second stabilizing frequencies by dividing said first stabilizing frequency by a plurality of predetermined factors, a plurality of interval generators connected to each of said second stabilizing frequency means, and whose output starting with the first of said interval generators are selectively connected to each other in succession, and said last generator is selectively connected to said frequency generator, a frequency divider connected to said first interval generator, an interval oscillator connected to said frequency divider to provide said first interval generator with a first interval frequency divided by a predetermined factor, means for generating a plurality of interval frequencies at the output of each of said interval generators from the sum or difference of a harmonic of said second stabilizing frequencies and said successively connected interval frequencies, switching means for selectively connecting any of said interval frequencies or said first interval frequency to said frequency generator, and means for calibrating each of said interval frequencies to be step-wise selectable on the tunable scale over the same frequency range as said first interval frequency, so that the output of said frequency generator can be selected by step-wise selection of said first interval frequency, by actuation of said switching means, and by step-wise selection of said successive interval frequencies.

12. A frequency generator comprising; a first fixed frequency generator for producing a first stabilized fixed frequency, a variable interval generator for producing a continuously variable interval frequency, a first generator connected to said first fixed frequency generator and said variable interval generator for producing an output frequency equal to the sum or difference of a harmonic of said first stabilized fixed frequency and said continuously variable interval frequency, a second fixed frequency generator for producing a second stabilized fixed frequency, a second generator connected to said second fixed frequency generator and said variable interval generator for producing an output frequency equal to the sum or difference of a harmonic of said second stabilized fixed frequency and said continuously variable interval frequency, a signal interval oscillator having a single scale for producing an output frequency, selecting means for changing the range of said scale by a predetermined factor, a frequency divider connected to said interval oscillator for dividing the variable interval oscillator frequency by the predetermined factor, and providing that divided frequency to said second generator, and a switching means to selectively connect either said interval oscillator or the output of said second generator to said first generator so as to provide said first generator with a variable interval frequency.

13. A frequency generator comprising; a first fixed frequency generator for producing a first stabilized fixed frequency, a variable interval generator for producing a continuously variable interval frequency, a first generator connected to said first fixed frequency generator and said variable interval generator for producing an output frequency equal to the sum or difference of a harmonic of said first stabilized fixed frequency and said continuously variable interval frequency, a second fixed frequency generator for producing a second stabilized fixed frequency, a second generator connected to said second fixed frequency generator and said variable interval generator for producing an output frequency equal to the sum or difference of a harmonic of said second stabilized fixed frequency and said continuously variable interval frequency, a single interval oscillator having a single scale for producing an output frequency, selecting means for changing the range of said scale by a predetermined factor, a frequency divider connected to the output of the second generator for dividing the frequency by the predetermined factor, and switching means to selectively connect either said interval oscillator or the output of said second generator divided by said predetermined factor to said first generator so as to provide said first generator with a variable interval frequency.

14. A frequency generator comprising; a first fixed frequency generator for producing a first stabilized fixed frequency, a variable interval generator for producing a continuously variable interval frequency, a first generator connected to said first fixed frequency generator and said variable interval generator for producing an output frequency equal to the sum or difference of a harmonic of said first stabilizing fixed frequency and said continuously variable interval frequency, a second fixed frequency generator for producing a second stabilized fixed frequency, a second generator connected to said second fixed frequency generator and said variable interval generator for producing an output frequency equal to the sum or difference of a harmonic of said second stabilized fixed frequency and said continuously variable interval frequency, a third fixed frequency generator for producing a third stabilized fixed frequency, a third generator for producing an output frequency equal to the sum of or difference of a harmonic of said third stabilized fixed frequency and said continuously variable interval frequency, a single interval oscillator having a single scale, selecting means for changing the range of said scale by a first or second predetermined factor, a first frequency divider connected to said interval oscillator for dividing the variable oscillator frequency by the predetermined first factor and providing that divided frequency to said second generator, a second frequency divider connected to the interval oscillator for dividing the variable interval oscillator frequency by the second predetermined factor and providing that divided frequency to said third generator, and switching means having three selective positions connected to the input of said first generator such that in the first position said input is operatively connected to said interval oscillator, and in the second position said input is operatively connected to the output of said second generator so as to provide said first generator with a variable interval frequency, and in the third position the output of said third generator is operatively connected to said second generator so as to provide said second generator with a variable interval frequency and the output of said second generator is operatively connected to said intput of said first generator.

15. The frequency generator as recited in claim 12 wherein said harmonic frequencies are derived from the stabilized frequencies by division.

16. The frequency generator as recited in claim 12 wherein said harmonic frequencies are derived from the stabilized frequencies by multiplication.

17. The frequency generator as recited in claim 12 wherein the range of said scale can be changed by a factor of ten.

18. The frequency generator as recited in claim 12 wherein said switching means additionally comprises a means for switching over the start and end figures of the frequency range of said scale, while the setting of the figures on the scale remain unchanged.

19. The frequency generator as recited in claim 12 wherein the component of frequency derived from said first stabilized frequency of the output frequency is readable in figures from the start of said continuous scale.

20. The frequency generator as recited in claim 12 further comprising means for forming said output frequency as sum or difference between said first stabilized frequency and the first interval frequency.

21. The frequency generator as recited in claim 12 further comprising means for forming said output frequency as sum or difference between said first stabilized frequency and said second interval frequency.

22. The frequency generator as recited in claim 12 wherein said factor is switchable to various integral values.

23. In a heterodyne receiver: a first conversion oscillator, said oscillator comprising; a first fixed frequency generator for producing a first stabilized fixed frequency, a variable interval generator for producing a continuously variable interval frequency, a first generator connected to said first fixed frequency generator and said variable interval generator for producing an output frequency equal to the sum or difference of a harmonic of said first stabilized fixed frequency and said continuously variable interval frequency, a second fixed frequency generator for producing a second stabilized fixed frequency, a second generator connected to said second fixed frequency generator and said variable interval generator for producing an output frequency equal to the sum or difference of a harmonic of said second stabilized fixed frequency and said continuously variable interval frequency, a single interval oscillator having a single scale for producing an output frequency, selecting means for changing the range of said scale by a predetermined factor, a frequency divider connected to said interval oscillator for dividing the variable interval oscillator frequency by the predetermined factor, and providing that divided frequency to said second generator, and a switching means to selectively connect either said interval oscillator or the output frequency of said second generator to said first generator so as to provide said first generator with a variable interval frequency.

24. In a double conversion heterodyne receiver: a variable frequency second oscillator, said second oscillator comprising; a first fixed frequency generator for producing a first stabilized fixed frequency, a variable interval generator for producing a continuously variable interval frequency, a first generator connected to said first fixed frequency generator and said variable interval generator for producing an output frequency equal to the sum or difference of a harmonic of said first stabilized fixed frequency and said continuously variable interval frequency, a second fixed frequency generator for producing a second stabilized fixed frequency, a second generator connected to said second fixed frequency generator and said variable interval generator for producing an output frequency equal to the sum or difference of a harmonic of said second stabilized fixed frequency and said continuously variable interval frequency, a single interval oscillator having a single scale for producing an output frequency, selecting means for changing the range of said scale by a predetermined factor, a frequency divider connected to said interval oscillator for dividing the variable interval oscillator frequency by the predetermined factor, and providing that divided frequency to said second generator, and a switching means to selectively connect either said interval oscillator or the output frequency of said second generator to said first generator so as to provide said first generator with a variable interval frequency.

25. The frequency generator as recited in claim 12 wherein the output frequency of said variable interval generator may be step-wise selectively reduced by said predetermined factor.

26. The frequency generator of claim 1 further characterized in that said generator forms part of a heterodyne receiver having a first conversion oscillator, said frequency generator constituting said first conversion oscillator.

27. The frequency generator of claim 1 further characterized in that said generator forms part of a heterodyne receiver with dual conversion and variable first intermediate frequency, said receiver having a second variable heterodyner, and said frequency generator constituting said second variable heterodyner.

28. The apparatus of claim 26 further characterized in that said receiver comprises an input circuit having variable tuning elements, means for varying said tuning elements, and means for varying the continuous part of the output frequency of said frequency generator substantially simultaneously with said tuning elements.

29. The apparatus of claim 27 further characterized in that said receiver comprises an input circuit having variable tuning elements, means for varying said tuning elements, and means for varying the continuous part of the output frequency of said frequency generator substantially simultaneously with said tuning elements.

References Cited by the Examiner

UNITED STATES PATENTS

| | | | |
|---|---|---|---|
| 2,868,973 | 1/1959 | Jensen et al. | 331—22 |
| 2,886,708 | 5/1959 | Perkins et al. | 331—22 |
| 3,126,515 | 3/1964 | Berman | 331—22 |

KATHLEEN H. CLAFFY, *Primary Examiner.*

D. G. REDINBAUGH, ROBERT H. ROSE, *Examiners.*

R. F. ROTELLA, R. LINN, *Assistant Examiners.*